(No Model.)
J. E. JONES.
CIDER PRESS.
No. 348,019. Patented Aug. 24, 1886.
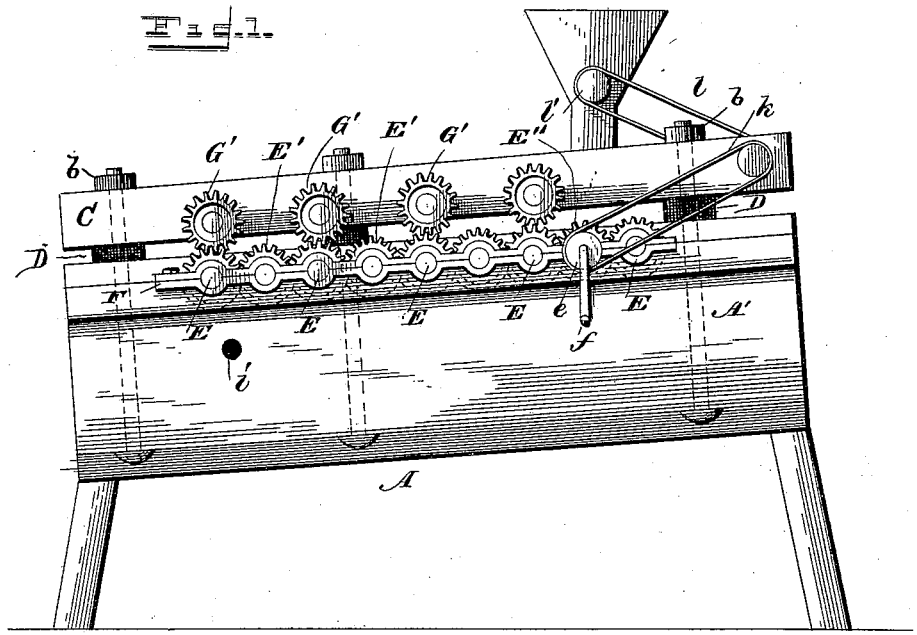
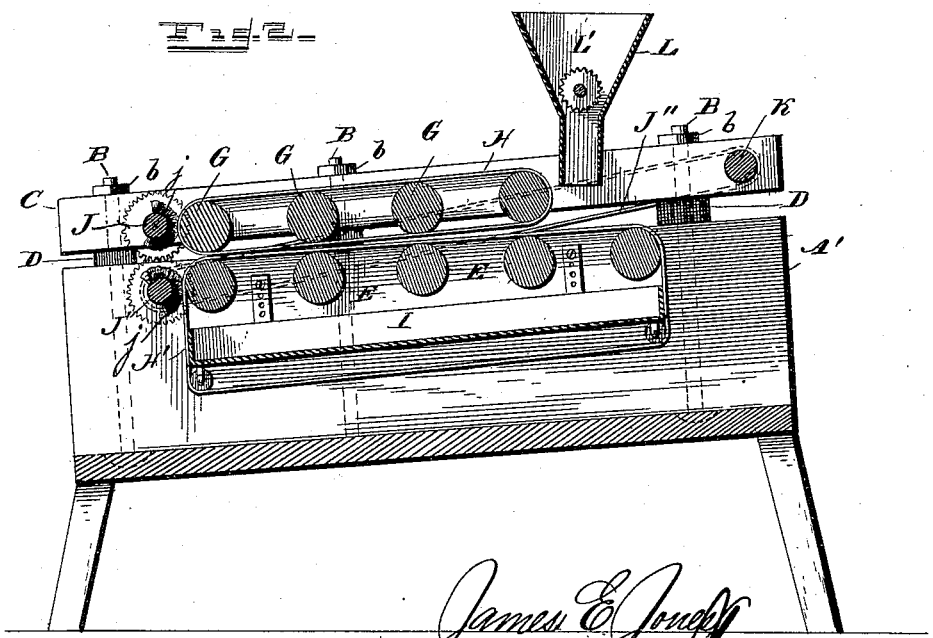
WITNESSES
INVENTOR
James E. Jones
Attorney

UNITED STATES PATENT OFFICE.

JAMES E. JONES, OF BLOOD'S DEPOT, NEW YORK.

CIDER-PRESS.

SPECIFICATION forming part of Letters Patent No. 348,019, dated August 24, 1886.

Application filed April 22, 1886. Serial No. 199,794. (No model.)

*To all whom it may concern:*

Be it known that I, JAMES E. JONES, a citizen of the United States of America, residing at Blood's Depot, in the county of Steuben and State of New York, have invented certain new and useful Improvements in Cider-Presses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in cider or wine presses; and it consists in the construction and combination of the parts, as will be hereinafter fully set forth, and specifically pointed out in the claim.

In the accompanying drawings, which illustrate my invention, Figure 1 is a side view of a press constructed in accordance with my invention, and Fig. 2 is a longitudinal section.

A refers to the base, which is mounted on supporting-legs, so as to be slightly inclined. This base is provided with vertical side pieces, A', through which extend bolts B B, which hold in position longitudinal bars C, which are mounted above the side pieces, A'. Between the side pieces, A', and the bars C upon the bolts are attached springs or rubber plates D, and the bolts are provided with nuts $b$, so that the bars C C may be brought near each other by turning the nut so as to compress the rubber springs D.

The upper edges of the side pieces, A', are provided with bearings for a series of transverse shafts E, which are preferably covered with rubber or some other equivalent material. These shafts E extend beyond one of the side pieces, A', and are secured to a longitudinal bearing-plate, F, which is made in two parts and is suitably attached to the side pieces, A'. Between this bearing-plate F and the side piece, A', adjacent thereto are journaled a series of cog-wheels, E', one of said cog-wheels E' having a shaft which extends through the bearing-plate F, where it is provided with a pulley, $e$, and a crank-handle, $f$, for operating the parts. The upper bar, C, has journaled thereon a series of rollers, G, which are provided with cog-wheels G', which mesh with the cog-wheels E' immediately beneath the same. These cog-wheels are provided with teeth of suitable length, so that they may be adjusted to and from each other so as to mesh.

Over the rollers G is placed an endless belt, H, of some water-proof material, said belt being turned when the rollers are rotated.

Immediately under the rollers E is secured a pan or receptacle, I, which is inclined, as shown in Fig. 2. At the lower end of this pan the same is provided with an outlet opening or spout, $i$, which extends through the side of one of the vertical side pieces, A'.

Over the rollers E, so as to extend above the same and around the bottom of the pan, is secured an endless belt, H', of fibrous material having an open mesh.

Adjacent to the end rollers, G and E, are secured shafts J and J', which are provided with brushes $j$, which will contact with the belts H and H', so as to remove the pomace therefrom. The shafts of these rollers are geared to each other by means of pinions or cog-wheels, one of said shafts having a belt, J'', which passes over a pulley and extends therefrom to a shaft, K, which is journaled in the upper end of the bar C, said shaft being driven by means of the belt $k$, which passes over the pulley $e$, hereinbefore referred to.

L refers to a hopper, which is secured to the main frame above the belt H', and said hopper is provided with a transverse crushing-roller, L', which has a serrated edge. This crushing-roller is rotated by means of a belt, $l$, which passes over a pulley on the shaft K and the pulley $l'$.

The operation of my invention is as follows: The apples or other materials from which it is desired to press the juice are first placed in the hopper L, and they are delivered in a partially-crushed condition through the spout of said hopper upon the belt H', and are carried thereupon under the belt H. As the materials pass between the rollers they are further crushed and the juice forced therefrom, which juice falls through the fabric belt into the pan I. It will be noted that the rollers, as they approach the end, are nearer each other, so that as the fruit passes toward the end rollers it is further compressed. When the pomace passes out from between the belts, it falls upon the base-board A, and what pomace may have adhered to the belts is removed therefrom by the brushes j. By means of these brushes the belts are kept clean and free from pomace. The lower belt, H', not only serves to convey the pomace from the hopper to the rollers, but also strains the same and prevents the pomace falling in the pan I. By loosening or tightening the bolts b any amount of pressure may be placed upon the rollers between which the pomace passes.

The press hereinbefore described is simple in construction and may be easily operated, and has not any complicated parts which are liable to become disarranged, and the gearing is all located outside of the side pieces, so that the pomace or the juice from the apples, when used as a cider-press, cannot come in contact with the same.

I claim—

In a wine or cider press, the combination of the rigid side pieces, A', having a side projecting bearing-bar, F, with journals rigidly attached thereto, and a bar, C, secured to the upper edge of the side pieces by bolts, springs D, a series of rollers journaled in the bar C, each alternate roller being provided with cog-wheels, rollers E, provided with gear-wheels which mesh with intermediate gear-wheels, E', a belt, H, of water-proof fabric, and a reticulate belt, H', brushes for removing the pomace from the belts, and a pan located within the pathway of the reticulate belt, the parts being combined and organized substantially as shown, and for the purpose set forth.

In testimony whereof I affix my signature in presence of two witnesses.

JAMES E. JONES. [L. S.]

Witnesses:
WILLIAM T. SLATTERY,
W. D. CLARK.